(12) United States Patent
Schirmer et al.

(10) Patent No.: US 7,096,218 B2
(45) Date of Patent: Aug. 22, 2006

(54) SEARCH REFINEMENT GRAPHICAL USER INTERFACE

(75) Inventors: Andrew Lewis Schirmer, Andover, MA (US); Cynthia Jeanne Regnante, North Andover, MA (US); James Scott Fitzgerald, Princeton, MA (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 10/043,098

(22) Filed: Jan. 14, 2002

(65) Prior Publication Data

US 2003/0135725 A1    Jul. 17, 2003

(51) Int. Cl.
G06F 17/30    (2006.01)

(52) U.S. Cl. .......................... 707/5; 3/4; 3/10
(58) Field of Classification Search .............. 707/1–10; 345/650–968
See application file for complete search history.

(56) References Cited

U.S. PATENT DOCUMENTS

| | | | | |
|---|---|---|---|---|
| 6,012,053 A * | 1/2000 | Pant et al. | ...................... | 707/3 |
| 6,012,063 A * | 1/2000 | Bodnar | ........................ | 707/101 |
| 6,078,917 A * | 6/2000 | Paulsen et al. | ................. | 707/6 |
| 6,169,986 B1 * | 1/2001 | Bowman et al. | ................ | 707/2 |
| 6,247,021 B1 * | 6/2001 | Himmel et al. | ............. | 345/738 |
| 6,321,224 B1 * | 11/2001 | Beall et al. | ...................... | 707/3 |
| 6,415,282 B1 * | 7/2002 | Mukherjea et al. | ............. | 707/3 |
| 6,523,021 B1 * | 2/2003 | Monberg et al. | ................ | 707/2 |
| 6,539,395 B1 * | 3/2003 | Gjerdingen et al. | ........ | 707/102 |
| 6,581,056 B1 * | 6/2003 | Rao | .............................. | 707/2 |
| 6,694,331 B1 * | 2/2004 | Lee | ................................ | 707/3 |
| 6,728,702 B1 * | 4/2004 | Subramaniam et al. | ........ | 707/3 |
| 6,732,092 B1 * | 5/2004 | Lucas et al. | .................... | 707/3 |
| 6,748,376 B1 * | 6/2004 | Beall et al. | ...................... | 707/3 |
| 6,772,150 B1 * | 8/2004 | Whitman et al. | .............. | 707/6 |
| 6,816,857 B1 * | 11/2004 | Weissman et al. | ............. | 707/5 |
| 6,907,424 B1 * | 6/2005 | Neal et al. | ...................... | 707/3 |
| 6,941,297 B1 * | 9/2005 | Carmel et al. | .................. | 707/3 |
| 2001/0051942 A1 * | 12/2001 | Toth | ............................... | 707/3 |
| 2002/0059210 A1 * | 5/2002 | Makus et al. | ................... | 707/3 |
| 2002/0138475 A1 * | 9/2002 | Lee | ................................ | 707/3 |
| 2002/0188603 A1 * | 12/2002 | Baird et al. | .................... | 707/3 |
| 2003/0097357 A1 * | 5/2003 | Ferrari et al. | .................. | 707/3 |
| 2004/0024688 A1 * | 2/2004 | Bi et al. | ....................... | 705/37 |

(Continued)

*Primary Examiner*—Jean M. Corrielus
*Assistant Examiner*—Anh Ly
(74) *Attorney, Agent, or Firm*—Pillsbury Winthrop Shaw Pittman LLP

(57) ABSTRACT

A system, method, and processor readable medium including processor readable code embodied therein are provided that enable a user to refine a search query using a graphical user interface. A user may be presented with a graphical user interface (GUI). The GUI may enable the user to input parameters into a first search query. The first search query may be run in a database. The system may determine whether any documents stored in the database satisfy the first search query. If the system determines that one or more documents satisfy the first search query, the system may retrieve a search results that includes the one or more documents. The system may then determine what type of information is included in the search result. Based on the type of information determination, the system may identify a search refinement option that may enable the user to limit the search result. The user may select a search refinement option to limit the search. The search refinement option may be applied to only those documents found in the search result. In this manner, the search query that includes the search refinement option does not need to be run against all of the objects in the database again.

17 Claims, 3 Drawing Sheets

U.S. PATENT DOCUMENTS

| | | | |
|---|---|---|---|
| 2004/0049522 A1* | 3/2004 | Streepy | 707/104.1 |
| 2004/0073868 A1* | 4/2004 | Easter et al. | 715/507 |
| 2004/0083213 A1* | 4/2004 | Wu et al. | 707/4 |
| 2004/0210568 A1* | 10/2004 | Makus et al. | 707/3 |
| 2004/0236736 A1* | 11/2004 | Whitman et al. | 707/3 |
| 2004/0260604 A1* | 12/2004 | Bedingfield | 705/14 |
| 2005/0050001 A1* | 3/2005 | Lucas et al. | 707/1 |
| 2005/0091205 A1* | 4/2005 | Sidlosky et al. | 707/3 |

* cited by examiner

SEARCH REFINEMENT GRAPHICAL USER INTERFACE

FIELD OF THE INVENTION

The invention relates to a system and method for refining a search query by limiting a set of refinement options based on knowledge of a search query result.

BACKGROUND OF THE INVENTION

Data search and retrieval systems for searching data collections are known. Generally, these collections are stored in one or more databases. Databases typically store records containing one or more fields. The data search and retrieval systems typically provide a graphical user interface in which a user may formulate a search query. The search query may limit a search based on the one or more fields provided in the records. These systems may be difficult to use because the systems are designed for general purpose searching of text strings. Little or no knowledge of the data collection being searched is provided.

Generally, a user inputs a search query that includes one or more search terms into the graphical user interface for searching a collection of data. The system retrieves a set of records that match the search query and presents a list of the records to the user. Depending on a number of records presented, the user may desire to further limit the search query. The user may edit and re-run the search query in an attempt to reduce the number of records retrieved. The system reprocesses the search query, including any additional search terms provided by the user, and presents a new search result to the user. This is inefficient.

Some systems provide refinement options for limiting a search query based on particular object types known to the system. Such systems, however, still provide broad search results that must be further refined by a user. This is typically accomplished by a user specifying additional search terms in a search query and restarting a search.

These and other drawbacks exist.

SUMMARY OF THE INVENTION

It is an object of the invention to overcome these and other drawbacks of existing systems.

Another object of the invention is to provide a system and method for searching data that determines a type of information found in a search result.

Another object of the invention is to provide a system and method for searching data that presents a user with search refinement options based on the type of information determined.

Another object of the invention is to provide a system and method for searching data that presents search refinement options based on a search result.

These and other objects of the invention are achieved according to various embodiments of the invention. According to one embodiment of the invention, a system, method, and processor readable medium comprising processor readable code embodied therein are provided that enable a user to refine a search query using a graphical user interface. A user may be presented with a graphical user interface (GUI). The GUI may enable the user to input parameters into a first search query. The first search query may be run in a database. The system may determine whether any documents stored in the database satisfy the first search query. If the system determines that one or more documents satisfy the first search query, the system may retrieve a search results that includes the one or more documents. The system may then determine what type of information is included in the search result. For example, the documents may describe books in a bookstore. Therefore, the documents may include author, title, and subject information. Based on the type of information determination, the system may identify a search refinement option that may enable the user to limit the search result. For example, if the search results describe books, the system may provide the user with search refinement options such as, "Documents authored by," "Documents about," or other search refinement option. The user may select a search refinement option to limit the search. The search refinement option may be applied to only those documents found in the search result. In this manner, the search query that includes the search refinement option does not need to be run against all of the objects in the database again.

These and other objects, features, and advantages of the invention will be readily apparent to those having ordinary skill in the pertinent art from the detailed descriptions of the embodiments with reference to the appropriate figures below.

DETAILED DESCRIPTION OF THE PREFERRED EMBODIMENTS

A system, method, and processor readable medium having processor readable code embodied therein for presenting a graphical user interface that enables a user to refine a search query and run the search against objects provided in a search result.

Figure 1:
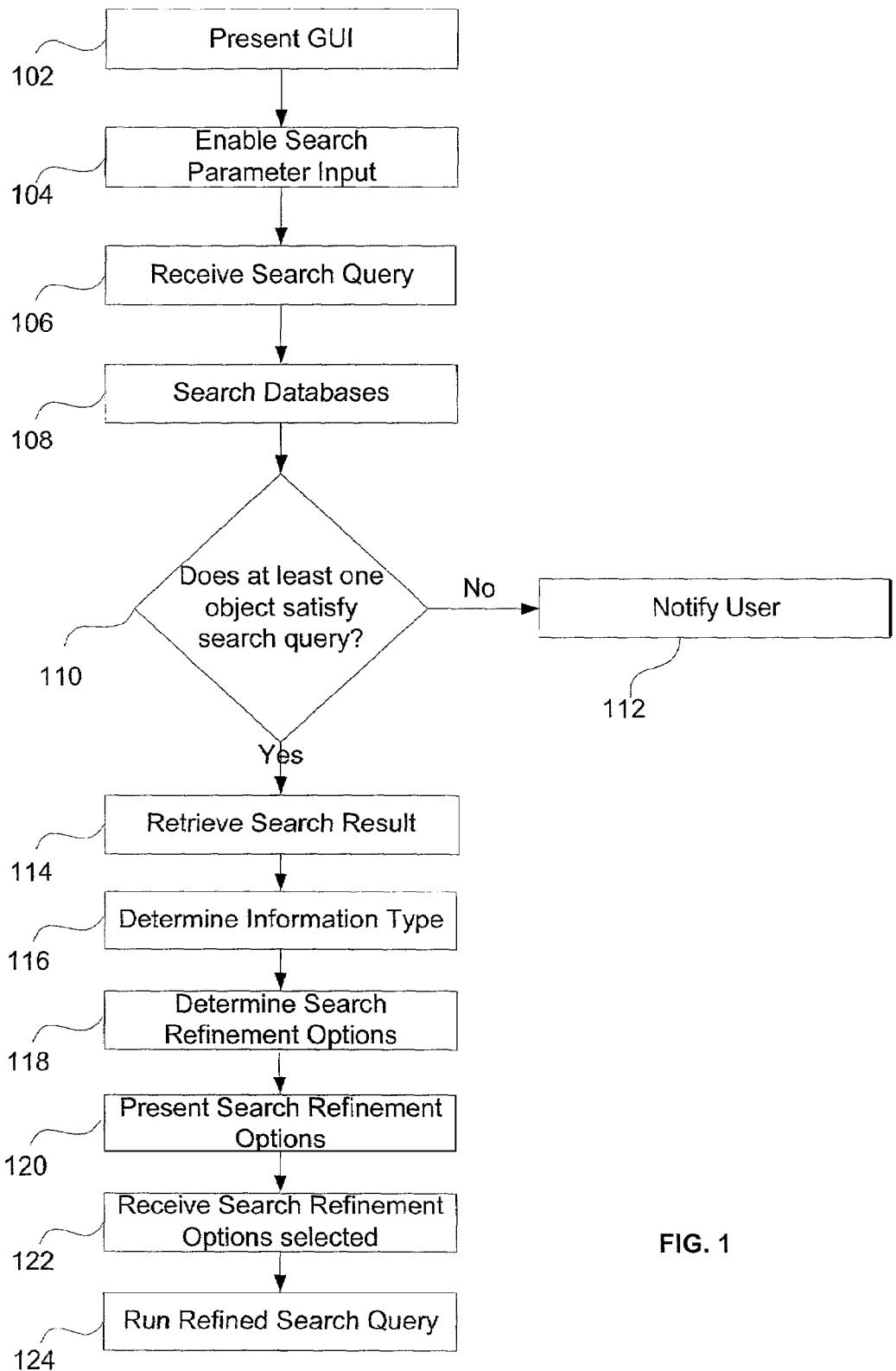
FIG. 1 is a schematic block diagram of a method for refining a search query according to one embodiment of the invention.

A method for refining a search query according to one embodiment of the invention is shown in FIG. 1. A graphical user interface (GUI) may be presented to a user, step 102. The GUI may enable a user to input one or more search parameters for a search query in, for example, a text field, step 104. The search query to be run against one or more databases may then be received, step 106. The one or more databases may be searched for objects, such as documents, images, or other object stored in the databases that satisfy the search query, step 108. A determination may be made regarding whether at least one object stored in the databases satisfies the search query, step 110. If a determination is made that at least one object does not satisfy the search query, the user may be notified as such, step 112.

If, however, at least one object satisfies the search query, all objects satisfying the search query may be retrieved, step 114. A determination may be made regarding, for example, a type of information included in the object, step 116. For example, the objects may describe books in a bookstore. Therefore, the objects may include author, title, and subject information. Based on the type of information determination, a determination may be made regarding search refinement options that may enable the user to limit the search result, step 118. For example, if the search results describe books, the system may provide the user with search refinement options such as, "Documents authored by," "Documents about," or other search refinement option. The search refinement options may then be presented to the user, step 120. The search refinement options may be presented, for example, in a drop-down menu (described in more detail with reference to FIGS. 3~5 below), adjacent radio buttons, as voice output or by another mechanism. The user may select one or more search refinement options using, for example, a conventional computer keyboard or mouse, light-pen, touch screen, voice recognition software or other mechanism. If a user is searching for everything about a particular topic, a drop-down menu presenting search refinement options may be displayed. The search refinement options preferably are determined based on the results of the search. For example, if only documents are returned in a search result, the search refinement options may only relate to documents. The search refinement options may include, for example, a documents about search refinement option or other document related option.

The search refinement option(s) selected may be received from the user, step 122. A refined search query may be run based on the search refinement options selected, step 124. According to one embodiment, the refined search query is run against only those objects retrieved in the search result. In this manner, the refined search query does not need to be run against all of the databases originally searched thus reducing processing time. The refined search query preferably only runs against the objects in the search result to potentially limit a number of objects in the search result according to the search refinement option(s) selected. After running the refined search query, another determination may be made regarding whether at least one object satisfies the refined search query, step 110. This process may be repeated until a user does not run additional search queries, no other objects satisfying the search query exist or other.

One advantage of the system is that a user's understanding of the results returned may be enhanced by limiting search refinement options. For example, if a user performs an "everything about" search and only document search refinement options are presented, the user may determine that only document objects are included in the search result.

Figure 2:
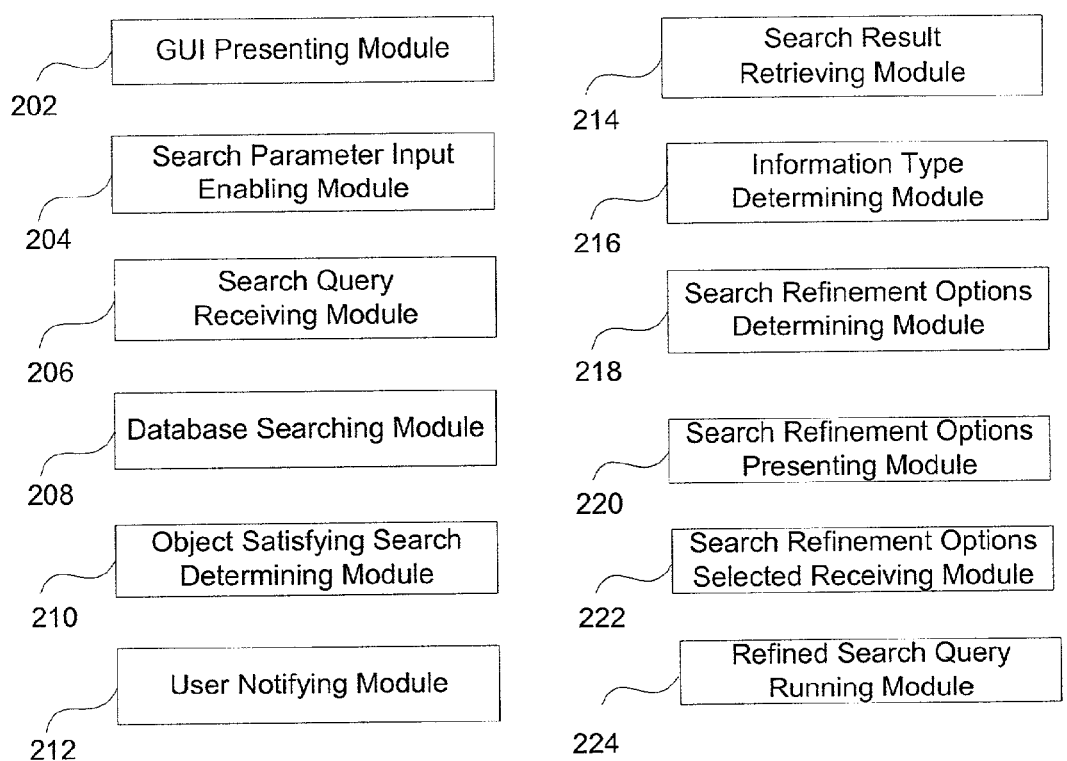
FIG. 2 is a schematic block diagram of a system for refining a search query according to one embodiment of the invention.

FIG. 2 illustrates a system 200 for refining a search query according to one embodiment of the invention. System 200 may include GUI presenting module 202, search parameter input enabling module 204, search query receiving module 206, database searching module 208, object satisfying search module 210, user notifying module 212, search result retrieving module 214, information type determining module 216, search refinement options determining module 218, search refinement options presenting module 220, search refinement options selection receiving module 222, and refined search query running module 224.

GUI presenting module 202 may be used to present a user with a GUI that enables the user to construct a search query to be run against one or more databases. The user may input one or more search parameters in, for example, a text field, using search parameter input enabling module 204. The user may submit a search query including the search parameters to be run against the databases. The search query may be received using search query receiving module 206. The search query may then be run against the databases using database searching module 208. A determination may be made regarding whether at least one object stored in the databases satisfies the search query. If no objects in the databases satisfy the search query, the user may be notified using user notifying module 212.

If, however, at least one object satisfies the search query, the object may be retrieved in a search result using search result retrieving module 214. A determination may then be made regarding, for example, a type of information included in the object using information type determining module 216. Based on this determination, one or more search refinement options may be determined using search refinement options determining module 218. According to one embodiment of the invention, the search refinement options may enable the user to limit the search results based on the objects retrieved in the search results. For example, if the search results describe books, the system may provide the user with search refinement options such as, "Documents authored by," "Documents about," or other search refinement option. The search refinement options may then be presented to the user using search refinement presenting options 220. The search refinement options may be presented, for example, in a dropdown menu (described in more detail with reference to FIGS. 3~5 below), adjacent radio buttons, as voice output or by another mechanism. The user may select one or more search refinement options using, for example, a conventional computer keyboard or mouse, light-pen, touch screen, voice recognition software or other mechanism. If a user is searching for everything about a particular topic, a drop-down menu presenting search refinement options may include, for example, documents about, documents authored by, people named, people who know about, people whose profile contains, categories about or other option.

The user may select one or more search refinement options to construct a refined search query and the search refinement options selected may be received using search refinement options receiving module 222. The refined search query may then be run, preferably against the search results from the first search query run. In this manner, only those objects in the search result are searched. This reduces processor time and errors and increases usability and user satisfaction because users are given a better understanding of the types of results that may be returned. Object satisfying search module 220 may then determine whether objects stored in the databases satisfy the refined search query and the system may function as described above.

Figure 3:
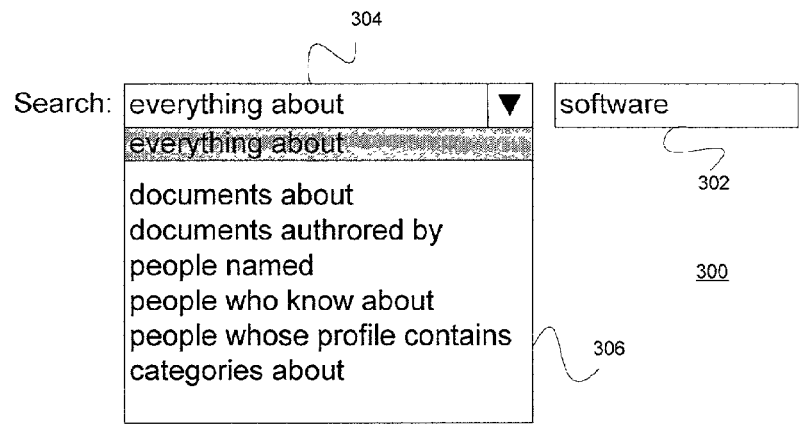
FIG. 3 is an illustration of a graphical user interface for refining a search query according to one embodiment of the invention.

FIG. 3 illustrates a graphical user interface 300 that may be used as an initial GUI for constructing a search query according to one embodiment of the invention. GUI 300 may include a text box 302. Text box 302 may enable a user to input one or more search parameters for creating a search query. A search qualifier box 304 may be used to indicate a scope of the search query. Search qualifier box 304 may be associated with drop-down menu 306. Drop-down menu may provide the user with a plurality of search qualifiers. For example, if the user desires to search everything about a particular topic, the user may select an "everything about" search qualifier from drop-down menu 306. Other options may also be provided, such as, for example, documents about, documents authored by, people named, people who know about, people whose profile contains, categories about or other option.

Figure 4:
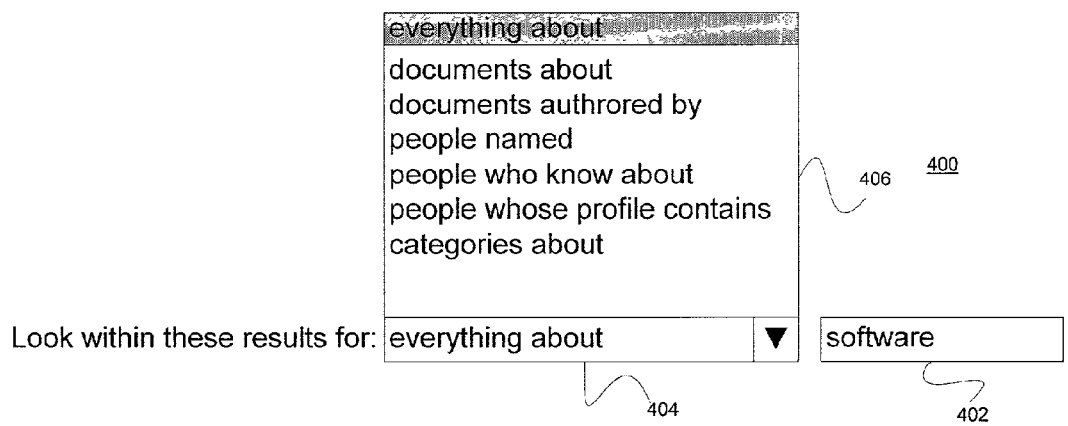
FIG. 4 is an illustration of a graphical user interface for refining a search query according to one embodiment of the invention.

FIG. 4 illustrates a search refinement GUT 400 according to one embodiment of the invention. GUT 400 may be presented to a user after a search query is run and at least one object is found that satisfies the search query. Alternatively, if only one object is found, a refinement may not be provided. GUI 400 may include a text box 402. Text box 402 may enable a user to input one or more search parameters for creating a refined search query. A search refinement options box 404 may be used to display a search refinement option selected by a user. The search refinement options may be presented in a drop-down menu 406. The search refinement options may vary depending on the types of objects discovered during a search as described above. Alternatively, search refinement options may be presented based on a search type. For example, if a user initially searches for everything about a particular topic, the user may be presented with all available search refinement options. If, however, the user initially searched for documents, the search refinement options presented may differ as shown in FIG. 5.

Figure 5:
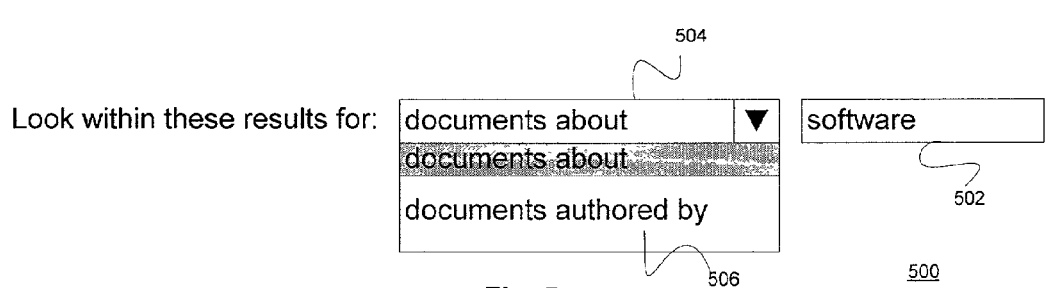
FIG. 5 is an illustration of a graphical user interface for refining a search query according to one embodiment of the invention.

FIG. 5 illustrates a search refinement GUT 500 for an initial document search query according to one embodiment of the invention. GUT 500 may include a text box 502 a search refinement option display box 504, and a drop-down menu 506. Based on the initial document search query, that may have been input using GUT 300 shown in FIG. 3, or the search results, drop-down menu 506 may display particular search refinement options. For example, for a document search or a documents only search result, dropdown menu 506 may display a "documents about" option or other document related option.

Alternatively, if a user had performed a people search initially or a people only search result was obtained, drop-down menu 506 may display people related search refinement options "people named," "people who know about," people whose profile contains," or other options. This may enable a user to search user profiles, directories or other data collections that may include such information.

According to another embodiment, a user may search categories of object initially or a categories only search result may be obtained. In this case, drop-down menu 506 may include a category related search refinement option "categories about" or other option. The refined search queries are preferably run against only the objects in the search result as indicated by the "Look within these results for" qualifier in FIGS. 4 and 5.

Other embodiments and uses of the invention will be apparent to those skilled in the art in consideration of the specification and practice of the invention is disclosed herein. The specification and examples should be considered exemplary only. For example, although the invention has been described in terms of a document, a document may be any or current document that may be categorized; for example, electronic mail messages, graphic files, or other type of electronic document. Additionally, although the invention has been described in terms of multiple modules, fewer or a greater number of modules may be used and modules may not be provided in the same location. The scope of the invention is only limited by the claims appended hereto.

What is claimed is:

1. A method for enabling a user to refine a search query using a graphical user interface, the method comprising the steps of:

presenting a graphical user interface to a user;

enabling a user to selectively input search parameters into a first search query using the graphical user interface, wherein the step of presenting comprises the steps of:

receiving the first search query;

searching at least one database for objects that satisfy the first search query;

determining whether at least one object stored in the database satisfies the first search query;

retrieving a first search result comprising the at least one object if a determination is made that the at least one object satisfies the first search query;

determining a type of information included in the at least one object associated with the first search result;

determining at least one search refinement option based on the type of information determined; and searching the first search result for objects that satisfy a second search query, the second search query comprising the at least one search refinement option.

2. The method of claim 1, further comprising the step of:

presenting the at least one search refinement option to the user.

3. The method of claim 2, wherein the at least one search refinement option is presented in a drop-down menu.

4. The method of claim 2, further comprising the step of:

enabling the user to select the at least one search refinement option.

5. The method of claim 4, further comprising the step of:

enabling the user to input the second search query comprising the at least one search refinement option.

6. A system for enabling a user to refine a search query using a graphical user interface, the system comprising:

presenting means for presenting a graphical user interface to a user;

search parameter inputting means for enabling a user to selectively input search parameters into a first search query using the graphical user interface;

receiving means for receiving the first search query;

searching means for searching at least one database for objects that satisfy the first search query;

first search query determining means for determining whether at least one object stored in the database satisfies the first search query;

retrieving means for retrieving a first search result comprising the at least one object if a determination is made that the at least one object satisfies the first search query;

information type determining means for determining a type of information included in the at least one object associated with the first search result;

search refinement option determining means for determining at least one search refinement option based on the type of information determined; and second search query inputting means for enabling the user to input a second search query comprising the at least one search refinement option, that searches the first search result for objects that satisfy the second search query.

7. The system of claim 6, further comprising search refinement option presenting means for presenting the at least one search refinement option to the user.

8. The system of claim 7, wherein the at least one search refinement option is presented in a drop-down menu.

9. The system of claim 7, further comprising search refinement option selecting means for enabling the user to select the at least one search refinement option.

10. A system for enabling a user to refine a search query using a graphical user interface, the system comprising:

a presenting module that presents a graphical user interface to a user;

a search parameter inputting module that enables a user to selectively input search parameters into a first search query using the graphical user interface;

a receiving module that receives the first search query;

a searching module that searches at least one database for objects that satisfy the first search query;

a first search query determining module that determines whether at least one object stored in the database satisfies the first search query;

a retrieving module that retrieves a first search result comprising the at least one object if a determination is made that the at least one object satisfies the first search query;

an information type determining module that determines a type of information included in the at least one object associated with the first search result;

a search refinement option determining module that determines at least one search refinement option based on the type of information determined; and a second search query inputting module that enables the user to input a second search query comprising the at least one search refinement option, that searches the first search result for objects that satisfy the second search query.

11. The system of claim 10, further comprising a search refinement option presenting module that presents the at least one search refinement option to the user.

12. The system of claim 11, wherein the at least one search refinement option is presented in a drop-down menu.

13. The system of claim 11, further comprising a search refinement option selecting module that enables the user to select the at least one search refinement option.

14. A processor readable medium comprising processor readable code embodied therein for causing a processor to enable a user to refine a first search query using a graphical user interface, the medium comprising:

presenting code that causes a processor to present a graphical user interface to a user;

search parameter inputting code that causes a processor to enable a user to selectively input search parameters into a first search query using the graphical user interface;

receiving code that causes a processor to receive the first search query;

searching code that causes a processor to search at least one database for objects that satisfy the first search query;

first search query determining code that causes a processor to determine whether at least one object stored in the database satisfies the first search query;

retrieving code that causes a processor to retrieve a first search result comprising the at least one object if a determination is made that the at least one object satisfies the first search query;

information type determining code that causes a processor to determine a type of information included in the at least one object associated with the first search result;

search refinement option determining code that causes a processor to determine at least one search refinement option based on the type of information determined; and second search query inputting code that causes a processor to enable the user to input a second search query comprising the search refinement option, that searches the first search result for objects that satisfy the second search query.

15. The medium of claim 14, further comprising a search refinement option presenting code that causes a processor to present the at least one search refinement option to the user.

16. The medium of claim 15, wherein the at least one search refinement option is presented in a drop-down menu.

17. The medium of claim 15, further comprising search refinement option selecting code that causes a processor to enable the user to select the at least one search refinement option.

* * * * *